United States Patent [19]
Anderson et al.

[11] Patent Number: 6,139,096
[45] Date of Patent: Oct. 31, 2000

[54] SEAT CUSHION AND TRAY ASSEMBLY

[75] Inventors: Rick A. Anderson, Grand Haven; Adam W. Callif, Holland, both of Mich.

[73] Assignee: Prince Technology Corporation, Holland, Mich.

[21] Appl. No.: 09/454,634

[22] Filed: Dec. 6, 1999

[51] Int. Cl.[7] ........................................... A47C 7/62
[52] U.S. Cl. ........................................ 297/188.1; 297/144
[58] Field of Search .................................... 297/105, 119, 297/129, 135, 144, 217.1, 188.01, 188.1, 188.11, 188.09; 224/275

[56] References Cited

U.S. PATENT DOCUMENTS

| | | |
|---|---|---|
| 1,769,343 | 7/1930 | Henry . |
| 2,582,703 | 1/1952 | Kirshbaum . |
| 2,804,122 | 8/1957 | Baum . |
| 5,597,199 | 1/1997 | Hoffman et al. . |
| 5,720,514 | 2/1998 | Carlsen et al. . |
| 5,816,650 | 10/1998 | Lucas, Jr. . |
| 5,848,820 | 12/1998 | Hecht et al. . |

*Primary Examiner*—Milton Nelson, Jr.
*Attorney, Agent, or Firm*—Harness, Dickey & Pierce, P.L.C.

[57] ABSTRACT

A seat cushion and tray assembly attachable to a seat frame of a vehicle. The assembly includes a seat cushion pivotally mounted to the seat frame, a tray slidably connected to the seat cushion, a first leg pivotally fastened to the tray and pivotally mounted to the seat frame, and a second leg pivotally fastened to the tray and pivotally fastened to the seat cushion. Upon rotation of the seat cushion from a generally horizontal seat position to a rotated position, the seat cushion, the first leg, and the second leg cooperate to move the tray from a stored position to a generally horizontal deployed position.

16 Claims, 4 Drawing Sheets

SEAT CUSHION AND TRAY ASSEMBLY

TECHNICAL FIELD OF THE INVENTION

This patent discloses and claims a useful, novel, and un-obvious invention for a seat cushion and tray assembly attachable to a seat frame of a vehicle. More specifically, the assembly includes a tray that deploys from a stored position to a generally horizontal deployed position.

BACKGROUND

While in a moving vehicle, both drivers and passengers benefit from the use of a deployable tray, preferably with a cup holder. In this regard, seat cushions are typically pivotally attached at their front end for manual deployment into a rotated position. In this rotated position, the seat cushions present a cup holder, otherwise hidden by the seat cushion when the seat cushion is in the stored position. Although these seat cushions benefit from their easy deployment, they are limited in their applicability because they do not deploy a working surface on which to rest the arms of the occupants of the vehicle, or on which to write notes.

SUMMARY OF THE INVENTION

Accordingly, this invention provides for a seat cushion and tray assembly that overcomes the problems and disadvantages of the conventional techniques in the art. The invention also provides for a seat cushion and tray assembly that has a relatively low profile and includes a tray with easy deployment features.

Briefly, the invention includes a seat cushion pivotally mounted to the seat frame, a tray slidably connected to the seat cushion, a first leg pivotally fastened to the tray and pivotally mounted to the seat frame, and a second leg pivotally fastened to the tray and pivotally fastened to the seat cushion. Upon rotation of the seat cushion from a generally horizontal seat position to a rotated position, the seat cushion, the first leg, and the second leg cooperate to move the tray from a stored position to a generally horizontal deployed position, thus providing easy deploymnent features.

BRIEF DESCRIPTION OF THE DRAWINGS

Further features and advantages of the invention will become apparent from the following discussion and accompanying drawings, in which.

DETAILED DESCRIPTION OF THE PREFERRED EMBODIMENT

The following description of the preferred embodiment is merely exemplary in nature, and is in no way intended to limit the invention or its application or uses.

Figure 1:
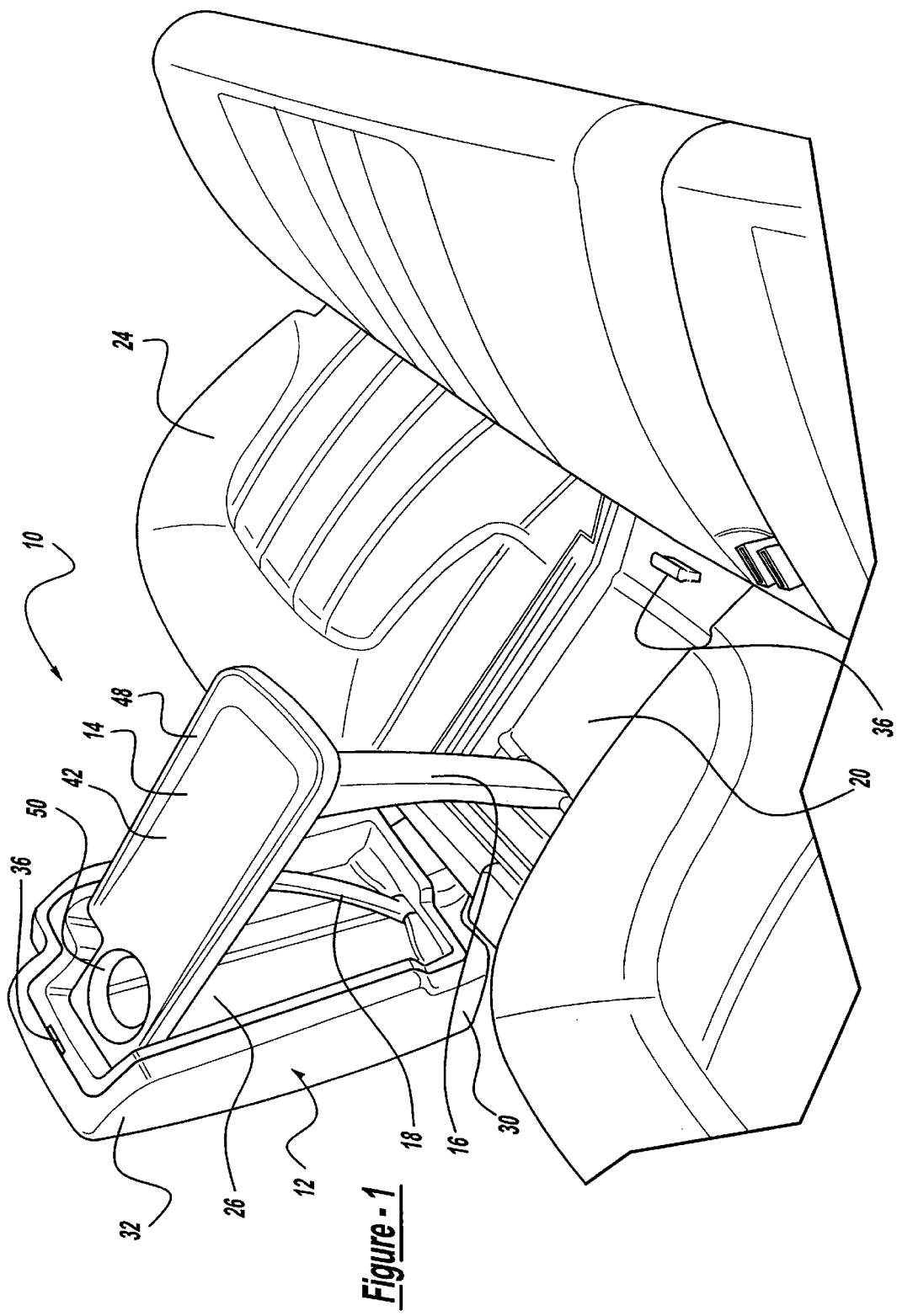
FIG. 1 is a perspective view of the seat and tray assembly according to the preferred embodiment of the invention.

As shown in FIG. 1, the seat cushion and tray assembly 10 of the invention includes a seat cushion 12, a tray 14, a first leg 16, and a second leg 18. The assembly 10 is attachable to a seat frame 20 of a vehicle. In certain seat applications, such as in the rear seats of a smaller car, the seat frame 20 is an integral part of the vehicle floorpan. In other seat applications, such as in the front seats of a larger car, the seat frame 20 is slidably attachable to the vehicle floorpan. Yet in other seat applications, such as in the rear seats of mini-vans, the seat frame 20 is wholly detachable from the vehicle floorpan. The seat frame 20 of each application, however, functions to support the seat cushion 12 for the occupants of the vehicle.

Figure 2:
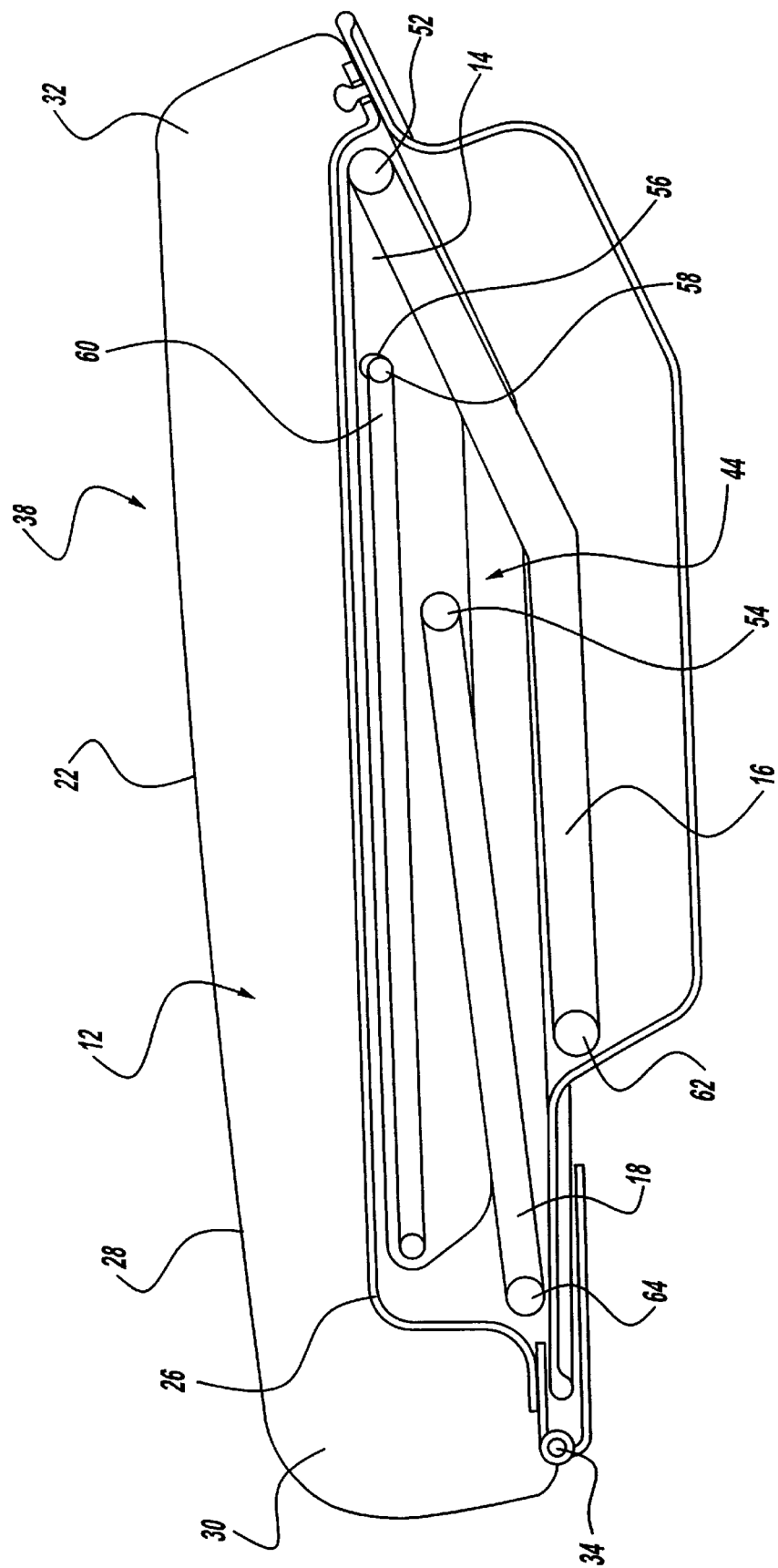
FIG. 2 is a cross-sectional view of the assembly, with the seat cushion in the generally horizontal seat position, taken along a line generally bi-secting the assembly.

As shown in FIGS. 1 and 2, the seat cushion 12 of the present invention functions to provide a seating surface 22 for the occupants of the vehicle, and to aid in the deployment and support of the tray 14. The seat cushion 12 preferably provides the seating surface 22 as the center seat of a three-person bench seat 24. In alternative embodiments of the present invention, the seat cushion 12 may provide the seating surface 22 of a two-person seat, or even as a stand-alone seat. The seat cushion 12 preferably includes a support structure 26, an interior foam core (not shown), and an exterior trim cover 28. The support structure 26 is preferably made from a stiff plastic, but may be made from other materials, such as metals and composites. The interior foam core and the exterior trim cover 28 are preferably made from conventional materials, well known and used in the seating arts. The seat cushion 12 also includes a front end 30 and a rear end 32. The front end 30 is pivotally mounted to the seat frame 20 by a first pivotal mount 34, while the rear end 32 is removably fastened to the seat cushion 12 by a two-piece latch assembly 36. The first pivotal mount 34 preferably includes a typical hinge, but may include other alternative hinges, such as a so-called "living hinge." As shown in FIGS. 2–4, the seat cushion 12 is rotatable about the first pivotal mount 34 from a generally horizontal seat position 38 to a rotated position 40.

The tray 14, which functions to provide a working surface 42 for the occupants of the vehicle, is movable from a stored position 44 to a generally horizontal deployed position 46. In the stored position 44, the tray 14 is preferably hidden by the seat cushion 12. In the generally horizontal deployed position 46, the working surface 42 of the tray 14 is preferably elevated to an appropriate height for the occupants of the vehicle. The working surface 42 preferably includes a lip 48, as shown in FIG. 1, that helps retain small objects on the working surface 42 during movement of the vehicle. The tray 14 also preferably includes a cup holder 50, but may include other convenience features, such as a cell-phone holder, a note pad clip, a pen and pencil holder, a light, a calculator, a sunglass holder, or an adjustable mirror.

Figure 3:
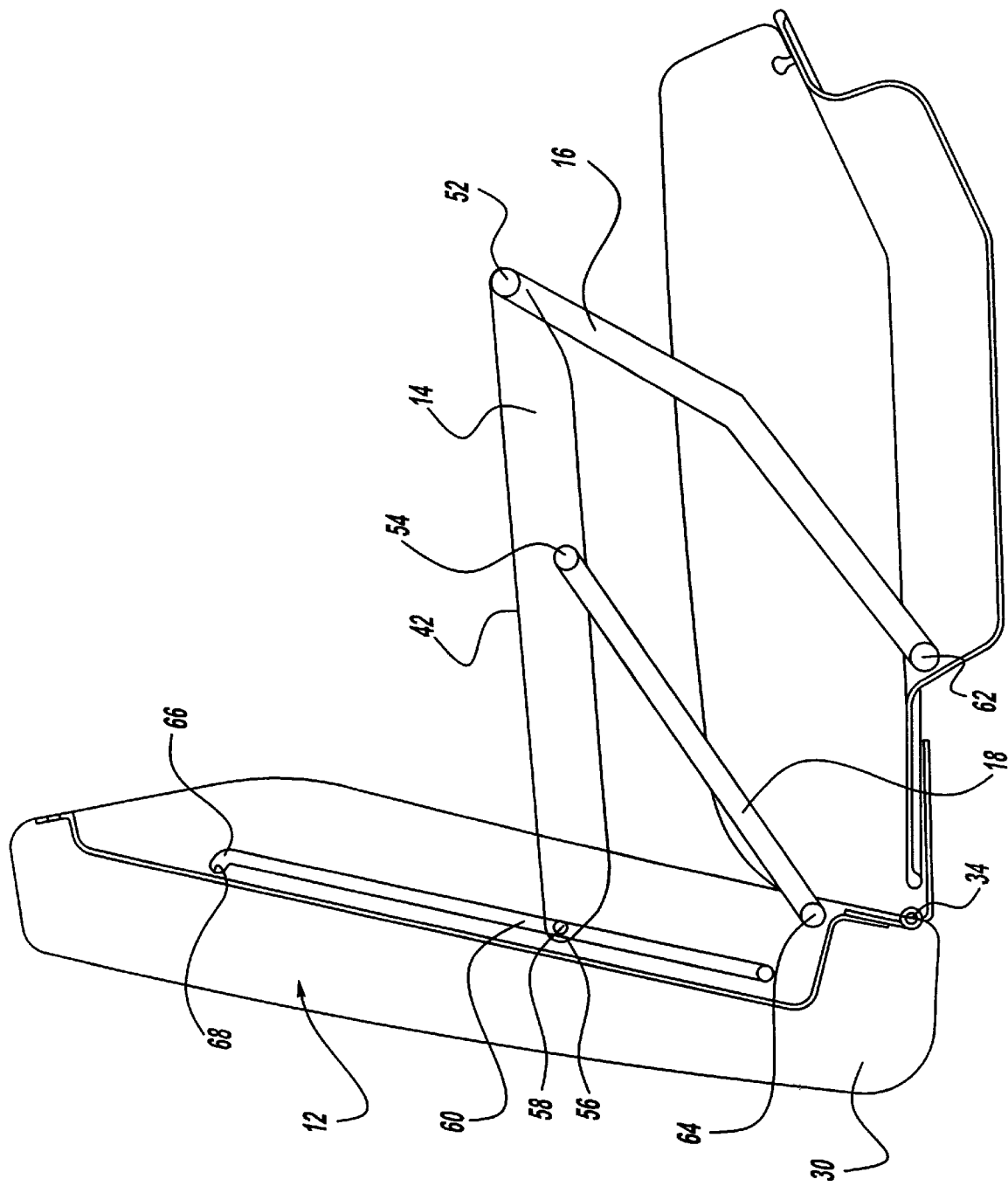
FIG. 3 is a view of the assembly, similar to FIG. 2, but with the seat cushion and the tray in a transitioning position.
Figure 4:
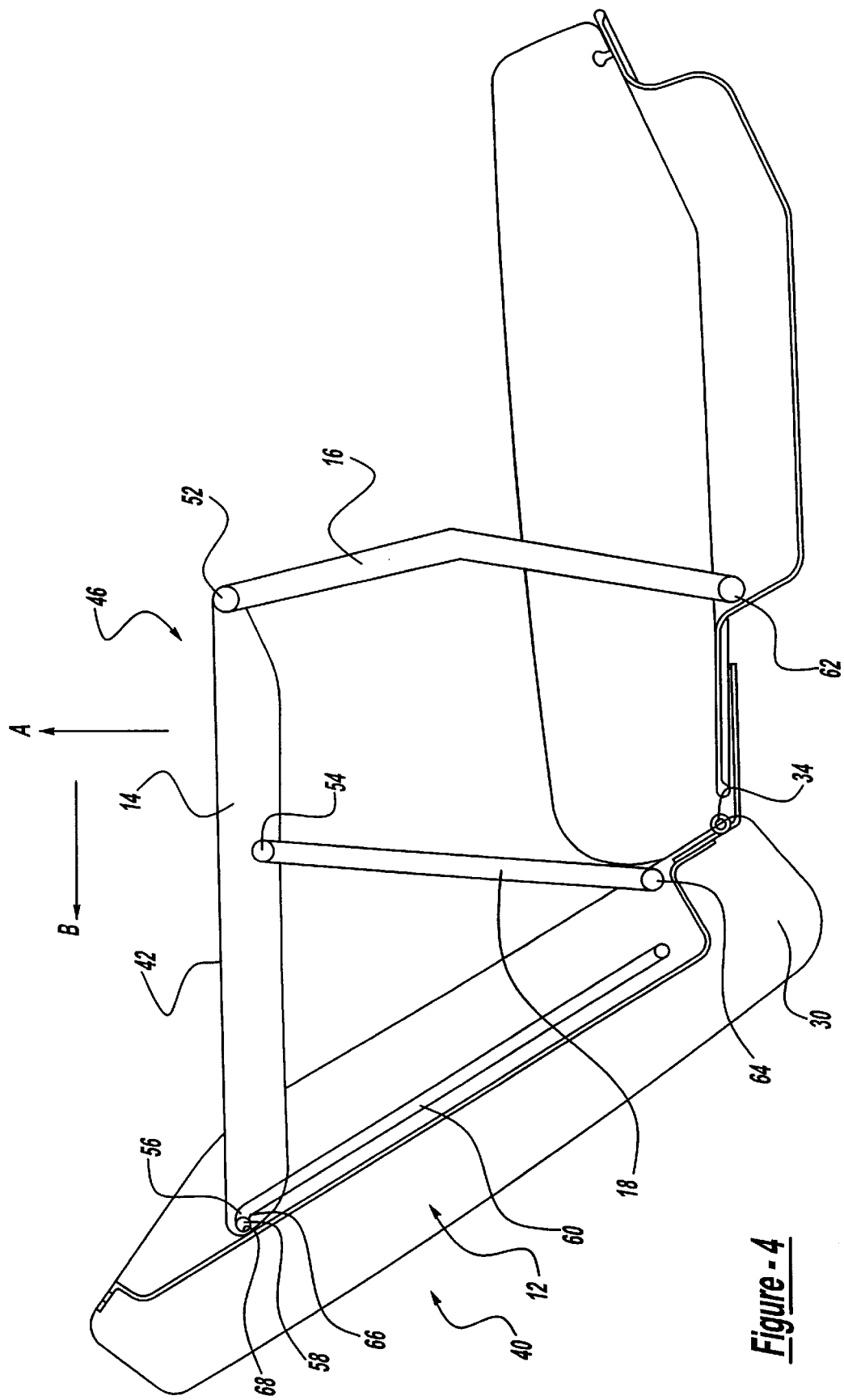
FIG. 4 is a view of the assembly, similar to FIG. 3, but with the tray in the generally horizontal deployed position.

As shown in FIGS. 2–4, the tray 14 is preferably supported by the first leg 16 with a first pivotal fastener 52, by the second leg 18 with a second pivotal fastener 54, and by the seat cushion 12 with a slidable connector 56. The first pivotal fastener 52 and the second pivotal preferably include a typical hinge, but may include other alternative hinges, such as the so-called "living hinge." The slidable connector 56 preferably includes a pair of pins 58, and a corresponding pair of slots 60. The pins 58 and slots 60 provide slide means for slidably connecting the tray 14 to the seat cushion 12.

The first leg 16 and the second leg 18, along with the seat cushion 12, cooperate to move the tray 14 from the stored position 44 to the generally horizontal deployed position 46 upon rotation of the seat cushion 12 from the generally horizontal seat position 38 to the rotated position 40. More specifically, the first leg 16, the second leg 18, and the seat cushion 12 provide movement means for moving the tray 14 from the stored position 44 to the generally horizontal deployed position 46. The deployment of the tray 14 is best initiated by a rotation of the seat cushion 12. During the deployment of the tray 14, the seat cushion 12 is rotated approximately 110° from the generally horizontal seat position 38 to the rotated position 40, while the tray 14 is preferably displaced in an upward direction A and a forward direction B, without any rotation. The first leg 16 is pivotally mounted to the seat frame 20 with a second pivotal mount 62, and the second leg 18 is preferably pivotally fastened to the seat cushion 12 near the front end 30 with a third pivotal fastener 64. In an alternative embodiment of the invention, the second leg 18 is pivotally mounted to the seat frame 20 with a third pivotal mount (not shown). The tray 14, the first leg 16, and the second leg 18, are all preferably made from stiff plastics, but may be made from other materials, such as metals and composites. The third pivotal fastener 64 and the second pivotal mount 62 preferably include a typical hinge, but may include other alternative hinges, such as the so-called "living hinge." In an alternative embodiment of the invention, the seat cushion and tray assembly may include a breakaway feature, incorporated into the legs, fasteners, or mounts, to allow the tray to collapse under excessive force without incurring any damage to the seat cushion or tray.

In the preferred embodiment of the invention, the slots 60 of the seat cushion 12 include stop surfaces 66. The stop surfaces 66 provide limit means for limiting the rotation of the seat cushion 12. Because the stop surfaces 66 limit the rotation of the seat cushion 12, the stop surfaces 66 also limit the movement of the tray 14. In this manner, the stop surfaces 66 prevent over-extension of the seat cushion 12, and properly stop the deployment of the tray 14 in the generally horizontal deployed position 46. Near the stop surfaces 66, the slots 60 may include detents 68, which function as retention means for retaining the tray 14 in the generally horizontal deployed position 46. As easily understood by a person skilled in the art, the retention means may includes other devices, such as a spring, an over-center spring, or a pin and latch, for retaining the tray 14.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A seat cushion and tray assembly attachable to a seat frame of a vehicle, comprising:

a seat cushion having a front end and a rear end, said front end being pivotally mountable to the seat frame, said seat cushion being rotatable from a generally horizontal seat position to a rotated position;

a tray slidably connected to said seat cushion, said tray being movable from a stored position to a generally horizontal deployed position;

a first leg pivotally fastened to said tray and pivotally mountable to the seat frame;

a second leg pivotally fastened to said tray and pivotally fastened to said seat cushion near said front end;

such that upon rotation of said seat cushion from said generally horizontal seat position to said rotated position, said seat cushion, said first leg, and said second leg cooperate to move said tray from said stored position to said generally horizontal deployed position.

2. The seat cushion and tray assembly of claim 1 wherein said seat cushion has at least one slot and said tray has at least one pin, such that said slot and said pin cooperate to slidably connect said tray to said cushion.

3. The seat cushion and tray assembly of claim 2 wherein said slot has a stop surface, such that said stop surface limits the rotation of said seat cushion and movement of said tray.

4. A seat cushion and tray assembly attachable to a seat frame of a vehicle, comprising:

a seat cushion pivotally mountable to the seat frame;

a tray connected to said seat cushion; and a first leg pivotally fastened to said tray and pivotally mountable to the seat frame;

such that upon rotation of said seat cushion, said seat cushion and said first leg cooperate to move said tray into a generally horizontal deployed position.

5. The seat cushion and tray assembly of claim 4 wherein said seat cushion has a front end and a rear end, said front end being pivotally mountable to the seat frame.

6. The seat cushion and tray assembly of claim 4 wherein said tray is slidably connected to said seat cushion.

7. The seat cushion and tray assembly of claim 6 wherein said seat cushion has at least one slot and said tray has at least one pin, such that said slot and said pin cooperate to slidably connect said tray to said cushion.

8. The seat cushion and tray assembly of claim 7 wherein said slot has a stop surface, such that said stop surface limits the rotation of said seat cushion and the movement of said tray.

9. The seat cushion and tray assembly of claim 4 wherein said seat cushion is rotatable from a generally horizontal seat position to a rotated position, and said tray is movable from a stored position to said generally horizontal deployed position.

10. The seat cushion and tray assembly of claim 4 further comprising a second leg pivotally fastened to said tray and pivotally fastened to one of said seat cushion and the seat frame.

11. The seat cushion and tray assembly of claim 4 further comprising a second leg pivotally fastened to said tray and pivotally fastened to said seat cushion.

12. The seat cushion and tray assembly of claim 4 wherein said tray includes a cup holder.

13. A seat cushion and tray assembly attachable to a seat frame of a vehicle, comprising:

a seat cushion having a front end and a rear end, said front end being pivotally mountable to the seat frame, said seat cushion being rotatable from a generally horizontal seat position to a rotated position;

a tray slidably connected to said seat cushion, said tray being movable from a stored position to a generally horizontal deployed position; and movement means for moving said tray from said stored position to said generally horizontal deployed position upon rotation of said seat cushion from said generally horizontal seat position to said rotated position.

14. The seat cushion and tray assembly of claim 13 further comprising slide means for slidably connecting said tray to said seat cushion.

15. The seat cushion and tray assembly of claim 13 further comprising limit means for limiting the rotation of said seat cushion.

16. The seat cushion and tray assembly of claim 13 further comprising retention means for retaining said tray in said generally horizontal deployed position.

* * * * *